UNITED STATES PATENT OFFICE.

JOSEPH VAN RUYMBEKE, OF CHICAGO, ILLINOIS, ASSIGNOR TO THE NATIONAL CHEMICAL AND FERTILIZER COMPANY, OF SAME PLACE.

PHOSPHATIC FERTILIZER.

SPECIFICATION forming part of Letters Patent No. 453,749, dated June 9, 1891.

Application filed June 20, 1890. Serial No. 356,136. (No specimens.)

*To all whom it may concern:*

Be it known that I, JOSEPH VAN RUYMBEKE, a subject of the King of Belgium, residing at Chicago, in the county of Cook and State of Illinois, have invented a certain new and useful Improvement in Phosphatic Fertilizers, which is fully set forth in the following specification.

The object of my present invention is to utilize iron and alumina phosphates and the product known as "stick," so as to obtain a compound thereof in a dry and merchantable condition for fertilizing purposes. It is well known that in order to make the natural phosphate rock valuable and available for fertilizing purposes it is necessary to render the phosphoric acid soluble. This is accomplished by treating the natural phosphates with an adequate proportion of sulphuric acid, whereby in the case of iron and alumina phosphates sulphates of iron and alumina are produced along with phosphoric acid. It is well known that stick is produced by concentrating tank-water, which has been separated from the solid matter in suspension, which solid matter is known as "tankage." Tank-water is obtained by the rendering of meats, fish, and other fatty matter, and contains the extract of these substances and the gelatinous material resulting from the prolonged action of water upon the muscle, cartilege, and bone of the material treated. The solution is first mechanically separated from the said solids in suspension, and this solution is what is known as "tank-water." This solution while still hot is then evaporated to at least 22° Baumé. The product is what is known as "stick," and is viscid and deliquescent. The entire operation must be performed without permitting the liquid to cool, in order to prevent decomposition, for fermentation sets in almost immediately upon the liquid becoming cool. If the solid matter in suspension, which is known as "tankage," is not separated from the solution and the two together are partially dried, so as to contain not more than fifty per cent. of water, the product will be only very slightly sticky, because the tankage is absolutely non-viscid and non-deliquescent; and this solid matter, called "tankage," is generally in the proportion of about three to one to the matter held in solution. Therefore a treatment adapted to the tankage product would not necessarily be adapted to the curing of stick, on account of the different nature of the two substances mentioned above. Furthermore, stick prepared as above explained can be kept almost indefinitely without undergoing any decomposition and consequent loss of nitrogen. On the other hand, the tankage mixture mentioned above, evaporated to about fifty per cent. of water, will putrefy rapidly, this process, in fact, commencing as soon as it is cooled off; but the product resulting from the treatment of phosphates with sulphuric acid, as mentioned above, is also sticky and deliquescent, as well as the stick itself.

I have heretofore discovered, as set forth in my patent, No. 367,732, dated August 2, 1887, that stick is best cured by soluble salts of iron and alumina, especially if they are slightly basic.

My present invention consists in the application of this discovery by combining the two sticky deliquescent substances mentioned above with carbonate of lime to form a fertilizer. This compound will be rich both in soluble phosphoric acid derived from the iron and alumina phosphates and in nitrogen derived from the stick.

In carrying out my invention to produce this compound I first treat the natural phosphate rock with sulphuric acid in the usual way, thereby obtaining a product containing the sulphate of iron and alumina and phosphoric acid. I submit this product in mass to a high degree of heat, as set forth in my prior application, Serial No. 325,795, whereby this acid phosphate is transformed into a metaphosphate with some sulphate of iron and sulphate of alumina, as explained in my said application. This iron and alumina metaphosphate is pulverized, and to the powdered substance I add and thoroughly mix therewith stick with which there has been mixed previously about fifteen per cent. of carbonate of lime. The addition of carbonate of lime as an ingredient is to produce basic sulphates of iron or alumina, which are more energetic in their action on stick than the acid sulphates. The mass, when thoroughly mixed, becomes in a few hours completely granulated and apparently dry, so as to be in a marketable condition. It is obvious that the proportions of the two elements—acidified rock and stick loaded with carbonate of lime—may be varied within large limits as long as sufficient sulphates of iron or alumina are present to cure the stick, and even an excess of these salts is not injurious. A good compound will be obtained by using about two thousand pounds of acidified rock with eight hundred pounds stick at about 24° Baumé, loaded with about fifteen per cent. of carbonate of lime. These proportions are not arbitrary, it being necessary only that there shall be added to the stick a sufficient quantity of the acidified rock to thoroughly cure the former by means of the sulphates contained therein, and this may be determined by calculation based on analysis of the elements or by observation of the change effected in mixing the elements together. The amount of carbonate of lime to be mixed with the stick may be varied also, for it is somewhat proportionate to the amount of sulphates with which the stick is to be mixed. It must always be insufficient in quantity to produce any oxide in excess of what can be taken up to make the basic sulphates, and this must be determined by analysis and calculation. When large quantities of sulphates are present in the phosphatic material and a comparatively small proportion of stick is used, a larger percentage of carbonate of lime will be necessary than when less sulphates and more stick are employed; but fifteen per cent. of the amount of stick used appears to be the highest limit of carbonate of lime which may be employed, any excess over this having the effect to revert or even make insoluble the acid phosphate or metaphosphate.

When a product is desired comparatively poor in phosphoric acid, but rich in nitrogen, it is not absolutely necessary to carry the degree of heat so high as to transform the acid phosphate into metaphosphate, but it is necessary in any case to submit the acidified rock to the action of a comparatively high degree of heat, otherwise there will not be a coagulation of the stick, so as to produce a stable dry granulated compound suitable for the trade. Ordinary acidified rock obtained by the usual treatment with sulphuric acid will not coagulate stick and produce a dry granulated material.

Having thus described my invention, what I claim as new, and desire to secure by Letters Patent, is—

A fertilizer consisting of a metaphosphate prepared by submitting acidified rock to the action of a high degree of heat, as described, and stick loaded with about fifteen per cent. of carbonate of lime mixed together and standing until granulated, substantially as described.

JOSEPH VAN RUYMBEKE.

Witnesses:
 CARRIE FEIGEL,
 A. M. BEST.